Patented Oct. 2, 1951

2,570,085

UNITED STATES PATENT OFFICE 2,570,085

METALLIFEROUS AZO-DYESTUFFS

Willi Widmer, Bottmingen, and Arthur Buehler, Rheinfelden, Switzerland, assignors to Ciba Limited, Basel, Switzerland, a Swiss firm No Drawing. Application March 2, 1948, Serial No. 12,685. In Switzerland March 7, 1947

7 Claims. (Cl. 260—147)

According to this invention valuable new metalliferous azo-dyestuffs are made by treating with an agent yielding metal an azo-dyestuff of the general formula

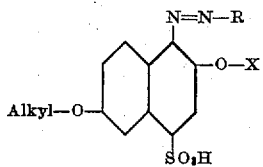

in which R represents the radical of a coupling component bound to the azo linkage in a position vicinal to a hydroxyl group, and X represents a hydrogen atom or an alkyl group, and, when X represents an alkyl group, conducting the treatment under conditions such that the said alkyl group is split off.

The monoazo-dyestuffs used as starting materials in the present invention which have the formula

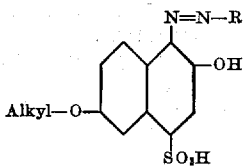

are also new, and can be made by coupling a diazotized 1-amino-2-hydroxy-6-alkoxynaphthalene-4-sulfonic acid with a coupling component which couples in a position vicinal to a hydroxyl group. Such a coupling component may owe its capacity for coupling, for example, to an aromatic hydroxyl group or to a reactive keto-methylene group.

Especially valuable results can be obtained with azo-dyestuffs which have been made from hydroxynaphthalenes, which couple in a position vicinal to a hydroxyl group, or from 5-pyrazolones.

As examples of coupling components yielding azo-dyestuffs especially suitable as starting materials in the present process there may be mentioned: hydroxynaphthalenes such as α-naphthol, β-naphthol, 1:3-dihydroxynaphthalene, 2:3-dihydroxynaphthalene, 2:6-dihydroxynaphthalene, 2:7-dihydroxynaphthalene, 2:6- or 2:7-hydroxy-methoxy-naphthalene, 1-acetylamino-7-hydroxynaphthalene, 5:8-dichloro-1-hydroxynaphthalene, 5-chloro-hydroxynaphthalene, 1-hydroxy-4-methylnaphthalene, 1-hydroxy-4-n-butylnaphthalene, 1-hydroxynaphthalene-4- or -5-sulfonamide, 1-hydroxynaphthalene - 8 - sulfonamide, 1-hydroxynaphthalene-8-sulfonic acid, 1-hydroxynaphthalene-4- or -5-sulfonic acid; 5-pyrazolones such as 1-phenyl-3-methyl-5 - pyrazolone, 1-(2'-chloro)-phenyl-3-methyl-5 - pyrazolone, 1-(2'-naphthyl)-3-methyl-5-pyrazolone, 1-(3'-sulfo)-phenyl-3-methyl - 5 - pyrazolone, 3-methyl-5-pyrazolone, 1-(4'-sulfo) - phenyl-5-pyrazolone-3-carboxylic acid, 1:3-diphenyl-5-pyrazolone,1-phenyl-5-pyrazolone-3-carboxylic acid amide; and also resorcinol, perinaphthindane-dione, acetoacetic acid anilide, barbituric acid, N-phenyl-4-hydroxy-2-quinolone, 2:4-dihydroxyquinoline, meta-phenylene diamine, 1-hydroxy-3-aminobenzene, 1-methyl-2-amino - 4-hydroxybenzene and 2-hydroxyanthracene.

Of the hydroxynaphthalenes, there are particularly useful in this connection the 1- and 2-hydroxynaphthalenes and the hydroxymonosulfonic acids which carry no additional substituents; and of the 5-pyrazolones, the 1-phenyl-3-methyl-5-pyrazolones are especially suitable.

Valuable metalliferous disazo-dyestuffs can also be obtained by the present invention, for example, by coupling 1 mol of a coupling component capable of coupling twice, for example, resorcinol, with 2 mols of a diazotized 1-amino-2-hydroxy-6-alkoxynaphthalene-4-sulfonic acid or with 1 mol of such a diazo-component and 1 mol of another diazo-component, or by coupling a diazotized 1-amino-2-hydroxy-6-alkoxynaphthalene-4-sulfonic acid with a so-called middle component, for example, 1-hydroxy-3-amino-4-methylbenzene, diazotizing the resulting aminoazo-dyestuff, coupling it with a further coupling component, for example, a pyrazolone, and treating the disazo-dyestuff so obtained with an agent yielding metal.

Among the azo-dyestuffs used as starting materials in the present process there are especially valuable those of which the alkoxy group (present in the radical of the 1-amino-2-hydroxy-6-alkoxynaphthalene-4-sulfonic acid) contains only a few carbon atoms as, for example, in the case of dyestuffs obtained from diazotized 1-amino-2-hydroxy-6-ethoxynaphthalene-4 - sulfonic acid and principally from diazotized 1-amino-2-hydroxy-6-methoxy - naphthalene - 4 - sulfonic acid.

The 1-amino-2-hydroxy-6-alkoxynaphthalene-4-sulfonic acids, from which the azo-dyestuffs used as starting materials in the present process may be made, may be prepared in the following manner:

By treating a 2-hydroxy-6-alkoxynaphthalene with a nitrosonating agent (for example, an alkali nitrite and a mineral acid) there is formed a 1-nitroso-2-hydroxy-6-alkoxynaphthalene, and the latter compound converted by the action of a solution of an alkali bisulfite into 2-hydroxy-6 - alkoxy-1-naphthyl - hydroxylamine sulfonic acid. By heating the latter in a medium rendered acid with mineral acid the desired 1-amino-2-hydroxy-6-alkoxy - naphthalene-4-sulfonic acid is obtained.

The diazotization of the 1-amino-2-hydroxy-6-alkoxynaphthalene-4-sulfonic acids is carried out in a manner known for compounds of this kind, that is to say, for 1:2- or 2:1-amino-hydroxy-naphthalenes, for example with the aid of sodium nitrite in the absence of a free mineral acid and in the presence of an equivalent quantity of a zinc salt or a small quantity of copper sulfate. The resulting diazo-compounds may, for example, be separated from the diazotization mixture by the addition of a mineral acid or sodium chloride, filtered and, if desired, dried. In this form they are stable products.

The coupling of the diazotized 1-amino-2-hydroxy-6-alkoxynaphthalene-4-sulfonic acids may likewise be carried out by methods in themselves known. It is generally carried out with advantage in an alkaline medium, for example, a medium rendered alkaline with an alkali carbonate to alkaline with caustic soda, if desired, in the presence of a suitable solvent, such as alcohol or pyridine, capable of assisting the coupling, or in the presence of an agent yielding metal, among which may be mentioned, for example, an agent yielding copper or yielding zinc, such as zinc chloride. These agents yielding metal may be used for assisting the coupling and, if desired, removed from the dyestuff after coupling when it is desired to form a complex with a different metal.

The treatment of the dyestuff with an agent yielding metal, in accordance with this invention, may be carried out, for example, with an agent yielding iron, nickel, cobalt, aluminium or copper. However, valuable products are principally obtained by treatment with an agent yielding chromium.

As agents yielding chromium there come into consideration practically all the chromium compounds which are customarily used for converting azo-dyestuffs into complex chromium compounds, thus, especially salts of trivalent chromium such as the acetate, formate and preferably the fluoride or sulfate. The treatment may be carried out with advantage in an aqueous medium, in the presence or absence of an organic solvent such as alcohol or pyridine, in an alkaline, neutral or acid medium, if desired, with the addition of a substance capable of forming complexes, such as an aliphatic or aromatic hydroxy - carboxylic acid, and, if desired, under atmospheric or superatmospheric pressure. In most cases it is of advantage to use 1 atomic proportion of chromium or a certain excess for each molecular proportion of dyestuff.

The complex metal compounds, and especially the complex chromium compounds, obtainable by the present process can, however, also be made by starting from an azo-dyestuff of the general formula

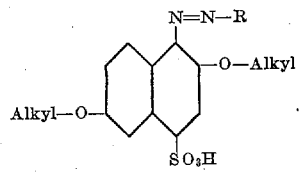

in which R represents the radical of a coupling component bound to the azo linkage in a position vicinal to a hydroxyl group, and carrying out the treatment with an agent yielding metal under conditions such that the alkyl group, which is present in the —O-alkyl group in the position vicinal to the azo linkage, is split off. This can be brought about, for example, by treating the dyestuff with an agent yielding metal, for example, an agent yielding copper such as a copper tetramine salt, under energetic reaction conditions. In this connection there comes into consideration, above all, treatment with an agent yielding chromium, for example, treatment with chromium sulfate or chromium formate in an aqueous medium under pressure and at a raised temperature, for example, a temperature ranging from 110° C. to 140° C. The azo-dyestuffs of the above formula serving as starting materials in the latter form of the process may be obtained by methods in themselves known from a diazotized 1 - amino-2:6-dialkoxynaphthalene-4-sulfonic acid and a coupling component which couples in a position vicinal to a hydroxyl group. As coupling components there may also be used in this connection the compounds hereinbefore named as coupling components; and furthermore coupling components such, for example, as 2-hydroxynaphthalene-8-sulfonic acid or 2-hydroxynaphthalene-6:8-disulfonic acid, which do not couple or couple with difficulty with ortho-hydroxy-diazo-compounds. 1-amino - 2:6 - dialkoxy-naphthalene-4-sulfonic acids may be obtained from 2:6-dialkoxynaphthalenes, for example, from 2:6-dimethoxynaphthalene, by nitration, reduction of the nitro-compound to the amino-group, and sulfonation.

The new products obtainable by one of the two foregoing processes are complex metal compounds of dyestuffs of the general formula

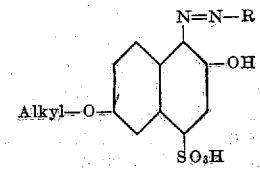

in which R represents the radical of a coupling component bound to the azo linkage in a position vicinal to a hydroxyl group. Among these products there are especially valuable the complex chromium compounds, and more particularly those of the monazo dyestuffs of the general formula

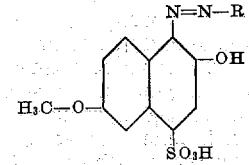

in which R represents the radical of a hydroxynaphthalene bound to the azo linkage in a position vicinal to a hydroxyl group, or the radical of a 5-pyrazolone bound to the azo linkage in the 4-position.

The complex metal compounds obtainable by the invention, and above all the complex chromium compounds, are suitable for dyeing various materials, particularly those of animal origin, such as casein or gelatine, and principally for dyeing or printing animal textile fibers, such as wool, silk or leather, and also fibers having similar dyeing properties such as artificial wool from casein fibers, animalized cellulose artificial silk, and, if desired, for dyeing and printing artificial fibers of superpolyamides or superpolyurethanes.

In this manner there are obtained valuable, level and generally very pure dyeings having good properties of fastness. As compared with dyeings produced with dyestuffs of similar constitution, for example, the corresponding dyestuffs from diazotized 1-amino-2-hydroxynaphthalene-4-sulfonic acid, the dyeings produced with complex chromium compounds obtainable by the present invention are distinguished principally by the surprisingly great bathochromic shift in the color of the dyeing. Furthermore, they are in some cases distinguished from the dyeings obtainable with these known dyestuffs by the substantially better shades of their dyeings when viewed in artificial light.

The following examples illustrate the invention, the parts and percentages being by weight:

*Example 1*

14.3 parts of 2-hydroxynaphthalene are dissolved in 25 parts of water with the addition of 5.6 parts of potassium hydroxide and 6.9 parts of potassium carbonate. About 30 parts of ethyl alcohol are then added, and the whole is cooled to 10–12° C. The diazo-compound obtained from 26.9 parts of 1-amino-2-hydroxy-6-methoxy-naphthalene-4-sulfonic acid is introduced in small portions into the solution in the course of one hour. After 12 hours the whole is heated to 30–35° C. and stirred at that temperature until the formation of dyestuff has ceased. The resulting dyestuff which corresponds to the formula

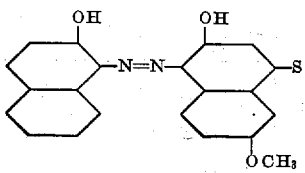

is separated by filtering with suction, and, if desired, purified by dissolution in water, reprecipitation with sodium chloride and filtration.

The dyestuff so obtained is boiled under reflux for 24 hours in 1500 parts of a chromium fluoride solution containing a quantity of chromium corresponding to 9.5 parts of $Cr_2O_3$. The resulting complex chromium compound, which is almost insoluble even in hot water, is separated by filtration, washed with hot water, and converted in known manner into its easily soluble sodium salt. The latter is precipitated by the addition of sodium chloride, and then separated by filtration and dried. The dyestuff is a violet black powder which dissolves in water with a blue violet coloration and in sodium carbonate solution with a blue coloration, and dyes wool from a sulfuric acid bath fast greenish blue tints.

The diazo-compound of 1-amino-2-hydroxy-6-methoxynaphthalene-4-sulfonic acid may be prepared as follows:

17.4 parts of 2-hydroxy-6-methoxynaphthalene are dissolved in 150 parts of water and 4 parts of sodium hydroxide at 50° C. 6.9 parts of sodium nitrite are added, and the whole is cooled to 0° C. by the addition of 100 to 150 parts of ice. 32 parts of sulfuric acid of 40 per cent strength are then added dropwise in the course of 3 hours, while stirring, the temperature being maintained at 0–3° C. by indirect cooling. The reaction mixture is maintained at that temperature for a further 2 hours, and the resulting 1-nitroso-2-hydroxy-6-methoxynaphthalene is separated by filtering with suction and washed free from acid with ice-water. The nitroso-compound so obtained, corresponding to the formula

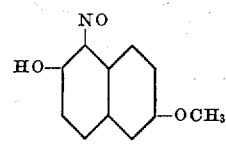

is of a brownish color. It may be used in the form of a paste in the manner described below.

The 1-nitroso-2-hydroxy-6-methoxynaphthalene obtained as described above is triturated with 50 parts of ice to form a paste, and mixed with 66 parts of a sodium bisulfite solution corresponding to 16 parts of $SO_2$. By slowly heating the mixture up to 50–60° C. the nitroso-compound passes into solution. The whole is filtered and the filtrate is mixed at 15–20° C. with the quantity of dilute sulfuric acid obtained from 20 parts of concentrated sulfuric acid of about 96 per cent. strength and 40 parts of ice. After 2 hours the whole is slowly heated to 50° C., whereupon 1-amino-2-hydroxy-6-methoxynaphthalene-4-sulfonic acid which corresponds to the formula

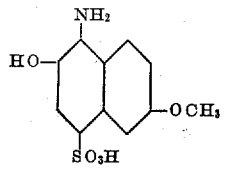

separates in the form of a pale grey compound. The compound is separated by filtration, and washed neutral with cold water. When dry it is a pale grey powder which dissolves easily in dilute alkalies.

26.9 parts of 1-amino-2-hydroxy-6-methoxy-naphthalene-4-sulfonic acid are suspended in 140 parts of water with the addition of 2 parts of crystalline copper sulfate, and the suspension is cooled to 0° C. A solution of 6.9 parts of sodium nitrite in 25 parts of water is added dropwise, and the whole is stirred for a further hour at 0–5° C. The resulting solution is freed from a small quantity of precipitated matter by filtration, the residue is washed with 100 parts of water, and the whole of the filtrate is mixed with 26.6 parts of hydrochloric acid of 30 per cent. strength. The diazo-compound of 1-amino-2-hydroxy-6-methoxy-naphthalene-4-sulfonic acid precipitates in the form of its pale yellow sodium salt. The latter is separated by filtering with suction and may be dried under reduced pressure at 60–70° C.

Example 2

22.4 parts of 1-hydroxynaphthalene-4-sulfonic acid are dissolved in 80 parts of water with the addition of 5.6 parts of potassium hydroxide and 6.9 parts of potassium carbonate. Into the resulting solution is introduced in the course of 1 hour at 20° C. the diazo compound obtained from 26.9 parts of 1-amino-2-hydroxy-6-methoxy-naphthalene-4-sulfonic acid. When the coupling has ceased the dyestuff obtained is completely precipitated by acidification or by the addition of potassium chloride and separated by filtration. It corresponds to the formula

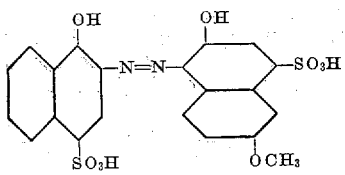

The dyestuff so obtained is boiled for 24 hours under reflux in 1000 parts of a chromium formate solution which contains a quantity of chromium corresponding to 9.5 parts of $Cr_2O_3$. The solution is filtered hot to remove impurities, and the complex chromium compound is precipitated from the filtrate by the addition of sodium chloride, and then separated by filtration and dried. The dyestuff is a blue-black powder having a bronze luster which dissolves in water with a blue coloration and in concentrated sulfuric acid with a green-blue coloration, and dyes wool from a sulfuric acid bath blue tints.

Example 3

A solution of 25.4 parts of 1-(4'-sulfo)-phenyl 3-methyl-5-pyrazolone, 4 parts of sodium hydroxide and 5.3 parts of sodium carbonate in 50 parts of water is cooled to 10° C. while stirring. The diazo-compound from 26.9 parts of 1-amino-2-hydroxy-6-methoxy-naphthalene-4-sulfonic acid is introduced in the course of 2 hours while stirring. When the coupling has ceased the whole is heated to 50° C., neutralized with hydrochloric acid and the resulting dyestuff is precipitated by the addition of sodium chloride and separated by filtration. It corresponds to the formula

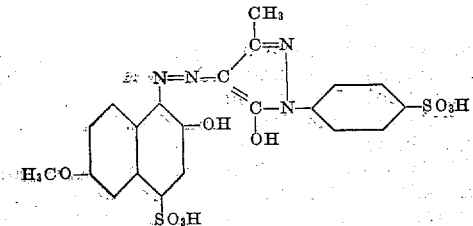

The dyestuff so obtained is boiled for 24 hours under reflux in 1200 parts of a chromium sulfate solution which contains a quantity of chromium corresponding to 9.5 parts of $Cr_2O_3$. The solution is clarified by filtration, and the complex chromium compound is precipitated from the filtrate by the addition of sodium chloride, then separated by filtration and dried. The dyestuff is a Bordeaux red powder which dissolves in water with a red-violet coloration and in concentrated sulfuric acid with an orange coloration, and dyes wool from a sulfuric acid bath very pure red-violet tints, having good properties of fastness.

A dyestuff having similar properties and corresponding to the formula

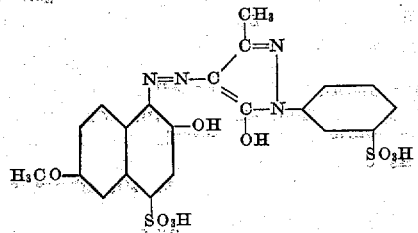

is obtained by starting from 1-(3'-sulfo)-phenyl-3-methyl-5-pyrazolone, instead of 1-(4'-sulfo)-phenyl-3-methyl-5-pyrazolone and in other respects following the procedure described above.

Example 4

The diazo compound from 26.9 parts of 1-amino-2-hydroxy-6-methoxynaphthalene-4-sulfonic acid is introduced in the course of 1 hour into a solution of 17.4 parts of 1-phenyl-3-methyl-5-pyrazolone and 4 parts of sodium hydroxide in 50 parts of water while stirring at room temperature. When the coupling has ceased the dyestuff is precipitated by the addition of hydrochloric acid, and separated by filtration. It corresponds to the formula

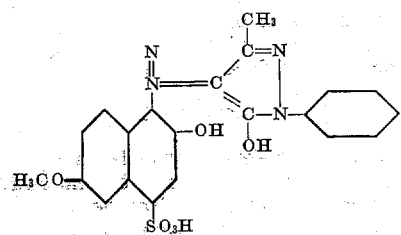

The dyestuff so obtained is boiled for 24 hours under reflux in a dilute chromium fluoride solution which contains a quantity of chromium corresponding to 9.5 parts of $Cr_2O_3$. The resulting complex chromium compound, after being worked up in the usual manner, is, in the dry state, a Bordeaux red powder which dyes wool from a sulfuric acid bath pure red-violet tints.

Example 5

22.4 parts of 1-hydroxynaphthalene-8-sulfonic acid are dissolved in 80 parts of water with the addition of 11.2 parts of potassium hydroxide. Into this solution is introduced at 20° C. in the course of 1 hour the diazo compound from 26.9 parts of 1-amino-2-hydroxy-6-methoxynaphthalene-4-sulfonic acid. When the coupling has ceased the resulting dyestuff which corresponds to the formula

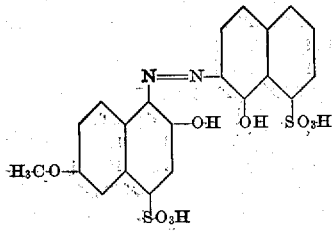

is completely precipitated by the addition of potassium chloride and separated by filtration. The dyestuff paste so obtained is boiled for 24 hours under reflux in 1000 parts of a chromium fluoride solution which contains a quantity of chromium corresponding to 9.5 parts of $Cr_2O_3$.

The solution is filtered hot, and the complex chromium compound is precipitated from the filtrate by the addition of sodium chloride, separated by filtration and dried. The dyestuff is a blue-black powder which dissolves in water with a blue coloration and in concentrated sulfuric acid with a green-blue coloration and dyes wool from a sulfuric acid bath pure greenish blue tints.

Example 6

28.3 parts of 1-amino-2:6-dimethoxynaphthalene-4-sulfonic acid (obtained from 2:6-dimethoxynaphthalene by nitration, reduction of the nitro compound and baking the sulfate of the base) are dissolved in water with the addition of 5.3 parts of sodium carbonate. To the solution having a green fluorescence are added 6.9 parts of sodium nitrite in 50 parts of water, and the temperature is brought to 0° C. By pouring the solution into a mixture of 30 parts of hydrochloric acid of 30 per cent. strength and 120 parts of water the diazo compound is obtained in the form of a sparingly soluble pale yellow body, which is then separated by filtration and introduced in the course of 2 hours into a cooled solution of 25.4 parts of 1-(3'-sulfo)-phenyl-3-methyl-5-pyrazolone, 4 parts of sodium hydroxide and 5.3 parts of sodium carbonate in 200 parts of water. When the coupling has ceased the dyestuff which corresponds to the formula

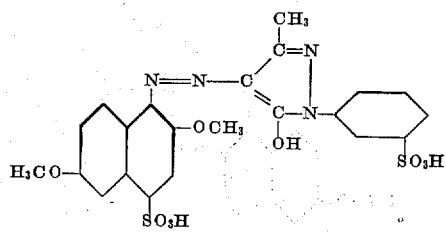

is precipitated by the addition of sodium chloride, then separated by filtration and dried. It is a red powder which dissolves in water with an orange coloration, in sodium carbonate solution with a yellow coloration and in concentrated sulfuric acid with a red-violet coloration.

The dyestuff so obtained is heated for 16 hours in a lead-lined autoclave at 120–130° C. with 400 parts of a chromium sulfate solution containing a quantity of chromium corresponding to 9.5 parts of $Cr_2O_3$. The resulting complex chromium compound of the dyestuff corresponding to the formula

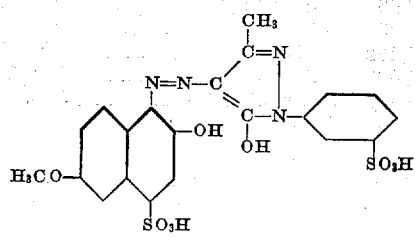

is rendered neutral to litmus by the addition of sodium carbonate, and precipitated by the addition of sodium chloride and separated by filtration. It is purified by redissolution in water and reprecipitation with sodium chloride. When dry, it is a brown-red powder which dissolves in water with a blue-red coloration, in sodium carbonate solution with a red coloration and in concentrated sulfuric acid with an orange coloration, and which corresponds to the dyestuff obtained as described in the third paragraph of Example 3. It dyes wool from a sulfuric acid bath red-violet tints.

By treating with chromium sulfate in the manner described above the dyestuff obtained by coupling diazotized 1-amino-2:6-dimethoxy-naphthalene-3-sulfonic acid with 2-hydroxynaphthalene, there is obtained a chromiferous dyestuff which corresponds to the dyestuff obtainable as described in Example 1.

Example 7

11 parts of 1:3-dihydroxybenzene are dissolved in 75 parts of water with the addition of 11.2 parts of potassium hydroxide, and the whole is brought to 0° C. by external cooling. The diazo compound obtained from 26.9 parts of 1-amino-2-hydroxy-6-methoxynaphthalene-4-sulfonic acid is introduced into the resulting solution in the course of 2 hours in small portions. When the coupling has ceased, the dyestuff obtained is precipitated by the addition of 11.5 parts of hydrochloric acid of 30 per cent. strength and sodium chloride, separated by filtration and, if desired, purified by dissolution in water and reprecipitation with sodium chloride.

The monoazo dyestuff so obtained is dissolved in 300 parts of water with the addition of 5.6 parts of potassium hydroxide and 6.9 parts of potassium carbonate, and the whole is brought to a temperature of 5° C. by indirect cooling, and coupled with the diazo compound obtained in known manner from 15.4 parts of 4-nitro-2-amino-1-hydroxybenzene. When the coupling has ceased the whole is heated to 60° C., and the dyestuff so obtained is precipitated by the addition of sodium chloride, separated by filtration and dried. It is a green black powder which dissolves in water and in sodium carbonate solution with a grey-black coloration and in concentrated sulfuric acid with a dark green coloration.

The disazo dyestuff so obtained is boiled under reflux for 20 hours with 1000 parts of a chromium sulfate solution containing a quantity of chromium corresponding to 19 parts of $Cr_2O_3$. The solution is filtered while hot to remove impurities, the complex chromium compound is precipitated by the addition of sodium chloride, separated by filtration and dried. It is a black powder which dissolves in water and in concentrated sulfuric acid with a dark green coloration and dyes box calf greenish black tints.

Example 8

55.5 parts of the disazo dyestuff obtained according to the first and second paragraphs of Example 7 are dissolved in 1000 parts of water with 24.6 parts of sodium acetate. 25 parts of crystallized copper sulfate dissolved in a small quantity of water are then added. After stirring for 6 hours at 80–85° C. the reaction mass is filtered while warm to remove impurities and the complex copper compound separated by the addition of sodium chloride, filtered and refluxed for 20 hours with 500 parts of a chromium sulfate solution containing the quantity of chromium which corresponds to 9.5 parts of $Cr_2O_3$. Impurities are removed by filtering the hot solution before the complex copper-chromium compound is precipitated by the addition of sodium chloride, filtered and dried. The compound is a black powder which dissolves in water to give a reddish black coloration, and in concentrated sulfuric acid with a dark green coloration and dyes box calf reddish black tints.

Example 9

100 parts of well wetted wool are entered at 40° C. into a dyebath which contains in 3000 parts of water 1.5 parts of the chromiferous dyestuff obtainable as described in Example 1 and 40 parts of sulfuric acid of 10 per cent. strength, and the bath is slowly heated to the boil. After boiling for ¼ hour a further 40 parts of sulfuric acid of 10 per cent. strength are added, and dyeing is continued at the boil for 1½ hours. The wool is then rinsed in the usual manner and finished. It is dyed a fast greenish-blue tint, the pure appearance of which is maintained in artificial light.

Having thus described the invention, what is claimed is:

1. A complex chromium compound of a monoazo dyestuff of the general formula

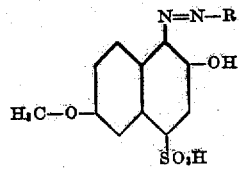

in which R stands for a member selected from the group consisting of a radical of a hydroxynaphthalene bound to the azo linkage in a position vicinal to a hydroxy group, and a radical of a 5-pyrazolone bound to the azo linkage in the 4-position.

2. A complex chromium compound of a monoazo dyestuff of the general formula

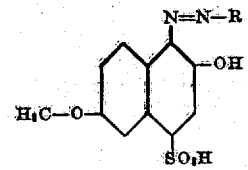

in which R stands for the radical of a hydroxynaphthalene bound to the azo linkage in a position vicinal to a hydroxyl group.

3. A complex chromium compound of a monoazo dyestuff of the general formula

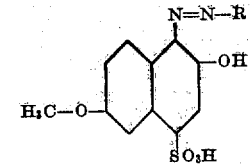

in which R stands for the radical of a 5-pyrazolone bound to the azo linkage in the 4-position.

4. A complex chromium compound of a monoazo dyestuff of the general formula

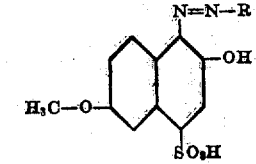

in which R stands for the radical of a 1-phenyl-3-methyl-5-pyrazolone bound to the azo linkage in the 4-position.

5. A complex chromium compound of the monoazo dyestuff of the formula

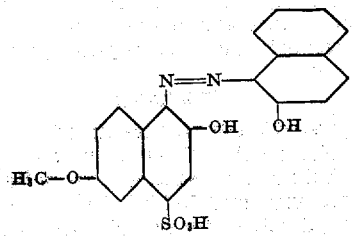

6. A complex chromium compound of the monoazo dyestuff of the formula

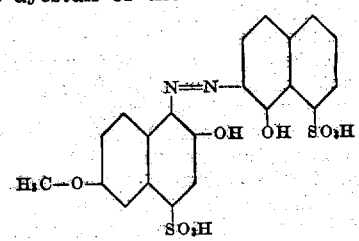

7. A complex chromium compound of the monoazo dyestuff of the formula

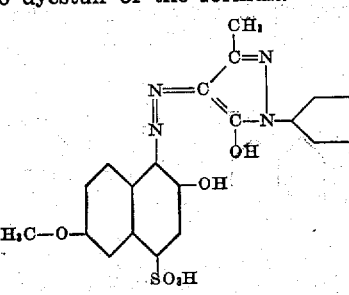

WILLI WIDMER.
ARTHUR BUEHLER.

REFERENCES CITED

The following references are of record in the file of this patent:

UNITED STATES PATENTS

| Number | Name | Date |
|---|---|---|
| 1,676,697 | Kaltwasser et al. | July 10, 1928 |
| 1,921,337 | Wiedemann et al. | Aug. 8, 1933 |
| 1,921,586 | Sack | Aug. 8, 1933 |
| 1,989,568 | Straub et al. | Jan. 29, 1935 |
| 1,990,257 | Straub et al. | Feb. 5, 1935 |
| 1,993,462 | Straub et al. | Mar. 5, 1935 |
| 2,008,601 | Straub et al. | July 16, 1935 |
| 2,452,171 | Straub et al. | Oct. 26, 1948 |

Certificate of Correction

Patent No. 2,570,085                        October 2, 1951

WILLI WIDMER ET AL.

It is hereby certified that error appears in the printed specification of the above numbered patent requiring correction as follows:

Column 8, lines 32 to 34, inclusive, for that portion of the formula reading  and that the said Letters Patent should be read as corrected above, so that the same may conform to the record of the case in the Patent Office.

Signed and sealed this 15th day of January, A. D. 1952.

[SEAL]

THOMAS F. MURPHY,
*Assistant Commissioner of Patents.*